United States Patent
Kato et al.

(10) Patent No.: US 9,521,163 B2
(45) Date of Patent: Dec. 13, 2016

(54) COMMUNICATION DEVICE AND COMMUNICATION CONTROL METHOD IN COMMUNICATION DEVICE

(71) Applicant: ALAXALA Networks Corporation, Kanagawa (JP)

(72) Inventors: Satoru Kato, Kawasaki (JP); Tomomi Suzuki, Kawasaki (JP); Michihiro Yoshida, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 72 days.

(21) Appl. No.: 14/573,069

(22) Filed: Dec. 17, 2014

(65) Prior Publication Data

US 2015/0249666 A1 Sep. 3, 2015

(30) Foreign Application Priority Data

Mar. 3, 2014 (JP) .................................. 2014-040047

(51) Int. Cl.
*G06F 15/16* (2006.01)
*H04L 29/06* (2006.01)

(52) U.S. Cl.
CPC .......... *H04L 63/1458* (2013.01); *H04L 63/08* (2013.01)

(58) Field of Classification Search
CPC .. H04L 63/0876; H04L 63/1458; H04L 63/08; H04L 29/06
USPC ........................................................ 726/2–7
See application file for complete search history.

(56) References Cited

U.S. PATENT DOCUMENTS

| 2004/0049586 | A1* | 3/2004 | Ocepek | H04L 29/12009 709/229 |
| 2005/0050365 | A1* | 3/2005 | Seki | H04L 63/1466 726/4 |
| 2006/0224774 | A1* | 10/2006 | Tanji | H04L 29/12009 709/245 |
| 2010/0241744 | A1 | 9/2010 | Fujiwara | |

FOREIGN PATENT DOCUMENTS

JP 2010-220066 A 9/2010

OTHER PUBLICATIONS

Gibson, Steve, "ARP Cache Poisoning", Dec. 11, 2005.

\* cited by examiner

*Primary Examiner* — Evans Desrosiers
(74) *Attorney, Agent, or Firm* — Mattingly & Malur, PC

(57) ABSTRACT

A system manager sets a port connected to a specific device (for example, a router device) among a plurality of ports of a switch device as a reliable port. If a packet is received in the reliable port, the switch device manages an IP address and a MAC address of the router device by a reliable port information table. When a packet is received from a port not set as the reliable port, the switch device refers to the reliable port information table. At this time, when the received packet is an address resolution packet having impersonated a router device, the switch device discards the packet without transmitting the packet, thereby preventing a cyber attack on a terminal.

8 Claims, 9 Drawing Sheets

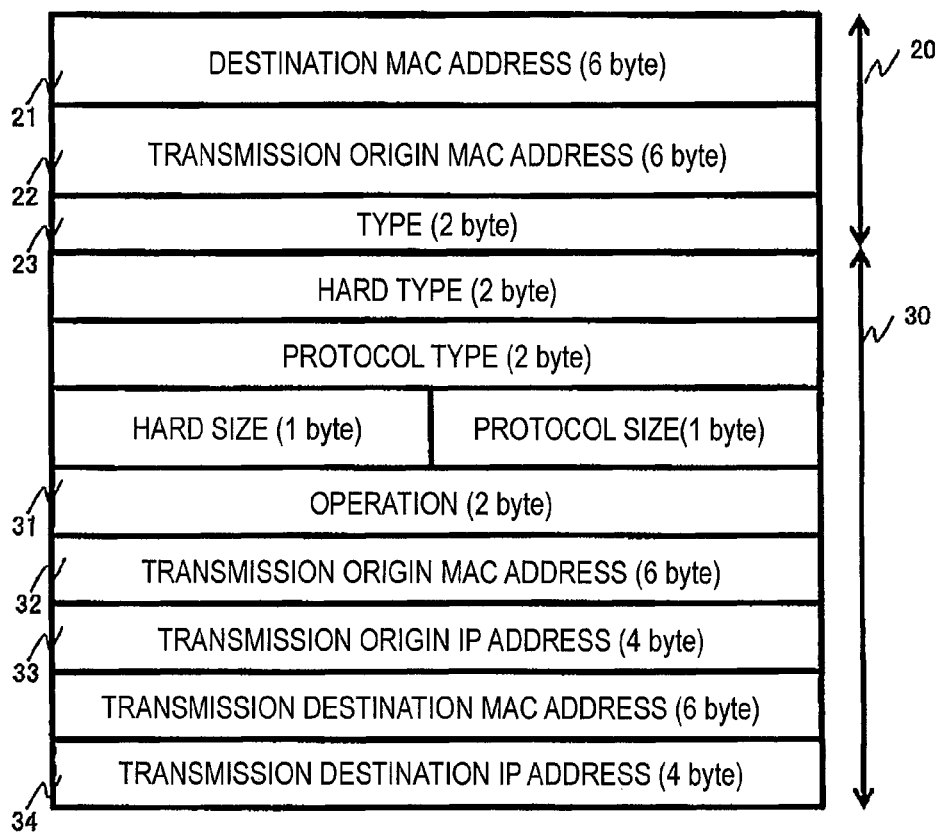

FIG. 5

```
1: interface PORT2
2:         mac-authentication port
3: interface PORT3
4:         mac-authentication port
5: mac-authentication system-auth-control
6: set mac-authentication mac-address MAC2
7: set mac-authentication mac-address MAC3
8: commit mac-authentication
9: interface PORT1
10:        arp-check-dhcp
```

FIG. 6

| RELIABLE PORT | ROUTER IP ADDRESS | ROUTER MAC ADDRESS |
|---|---|---|
| PORT 1 | IP 1 | MAC 1 |
|  |  |  |

| RELIABLE PORT (2110) | MODE (2140) | ROUTER IP ADDRESS (2120) | ROUTER MAC ADDRESS (2130) |
|---|---|---|---|
| PORT 1 | arp-check-dhcp | IP1 | MAC1 |
| PORT 3 | arp-check | IP3 | MAC3 |
|  |  |  |  |

2101

COMMUNICATION DEVICE AND COMMUNICATION CONTROL METHOD IN COMMUNICATION DEVICE

CROSS-REFERENCE TO RELATED APPLICATIONS

This application claims the priority of Japanese Patent Application No. 2014-040047, filed on Mar. 3, 2014, which is incorporated herein by reference in its entirety.

BACKGROUND OF THE INVENTION

1. Field of the Invention

The present invention relates to a communication device and communication control technology in the communication device.

2. Description of the Related Art

As the related art of a field of the present technology, JP-2010-220066-A is known. In JP-2010-220066-A, "a wrong PC detecting unit 204 of a monitoring unit 101 refers to a registration completion list and a detection list, detects an ARP request packet transmitted from a wrong node, and stores information needed to exclude an access by the wrong node in a transmission list. An ARP table camouflage unit 206 camouflages a MAC address of the wrong node with a MAC address of the monitoring unit 101, in an ARP table. A camouflage ARP request transmitting unit 207 transmits a camouflage ARP request packet to a node of the access destination of the wrong node. After an ARP reply packet for the camouflage ARP request packet is received from the node of the access destination of the wrong node, a camouflage ARP reply transmitting unit 208 transmits a camouflage ARP reply packet to the wrong node" is described (refer to Abstract).

In the related art, in a network (hereinafter, referred to as the "closed network") system used in a closed space to be represented by a company network, which is not physically connected to an external network and is used relatively safely against an attack from the external network by applying multiplex firewalls, when a wrong terminal is connected to the closed network, communication of an authentication terminal is protected by authentication terminal technology of JP-2010-220066-A using an address resolution protocol (ARP) ("ARP Cache Poisoning" Steve Gibson (2005-12-11)) to be one of address resolution packets and media access control (MAC) authentication. In the authentication terminal technology, the MAC address that is one of network addresses and is a physical address (a hardware address) is used as authentication information and communication of the terminal is permitted or prohibited by managing the MAC address of the terminal that exists in the closed network.

SUMMARY OF THE INVENTION

The MAC authentication is authentication technology for registering MAC address information of a communication permitted terminal in a network and for not permitting communication of a terminal having a non-registered MAC address and has a problem in that a wrong packet from an authentication completed terminal is not prevented from being transmitted.

For this reason, in JP-2010-220066-A, a wrong packet from a terminal authenticated in the closed network may not be prevented from being transmitted or transferred. As an example of the wrong packet, an address resolution packet may be used wrongly. Hereinafter, the problem will be described using an ARP packet used by IPv4 as an example of the address resolution packet. However, this is applicable to a neighbor discovery protocol (NDP) of an address resolution packet used by IPv6.

The authentication completed terminal in the closed network transmits a wrong ARP packet corresponding to a wrongly used ARP packet to another authentication completed terminal in the closed network and changes an ARP table to be correspondence information of a MAC address and an Internet protocol (IP) address of another authentication completed terminal in the closed network to a wrong ARP table. Because another authentication completed terminal in the closed network transmits a packet according to the wrong ARP table, another authentication completed terminal transmits the packet to a terminal which is not an original packet transmission destination, so that normal communication is disabled. As a result, communication interruption and wiretapping are enabled by transmission of the wrong ARP packet. That is, the wrong ARP packet is transmitted, so that a cyber attack conducting the communication interruption and the wiretapping is enabled.

Accordingly, an object of the present invention is to prevent an authentication completed terminal in a closed network from using an address resolution packet wrongly so as to prevent communication interruption and wiretapping of another authentication completed terminal in the closed network from occurring.

In order to solve at least one of the above problems, the following configurations or application embodiments in an aspect of the invention is achieved.

According to one aspect of the present invention, communication interruption and wiretapping of another authentication completed terminal in a closed network may be prevented from occurring by wrong use of an address resolution packet in an authentication completed terminal in the closed network.

BRIEF DESCRIPTION OF THE DRAWINGS

Other objects, configurations and effects of the invention will become apparent from the following description of embodiments with reference to the accompanying drawings in which:

FIG. 3 is a diagram illustrating an ARP packet;

FIG. 4 is a diagram illustrating an example of a FDB table of a switch device in a first embodiment;

FIG. 5 is a diagram illustrating an example of a command for setting configuration information to the switch device in the first embodiment;

FIG. 6 is a diagram illustrating an example of a reliable port information table of the switch device in the first embodiment;

FIG. 10 is a diagram illustrating an example of a reliable port information table in a modification.

DESCRIPTION OF THE PREFERRED EMBODIMENTS

Hereinafter, embodiments of the present invention will be described with reference to the accompanying drawings.

First Embodiment

Figure 1:
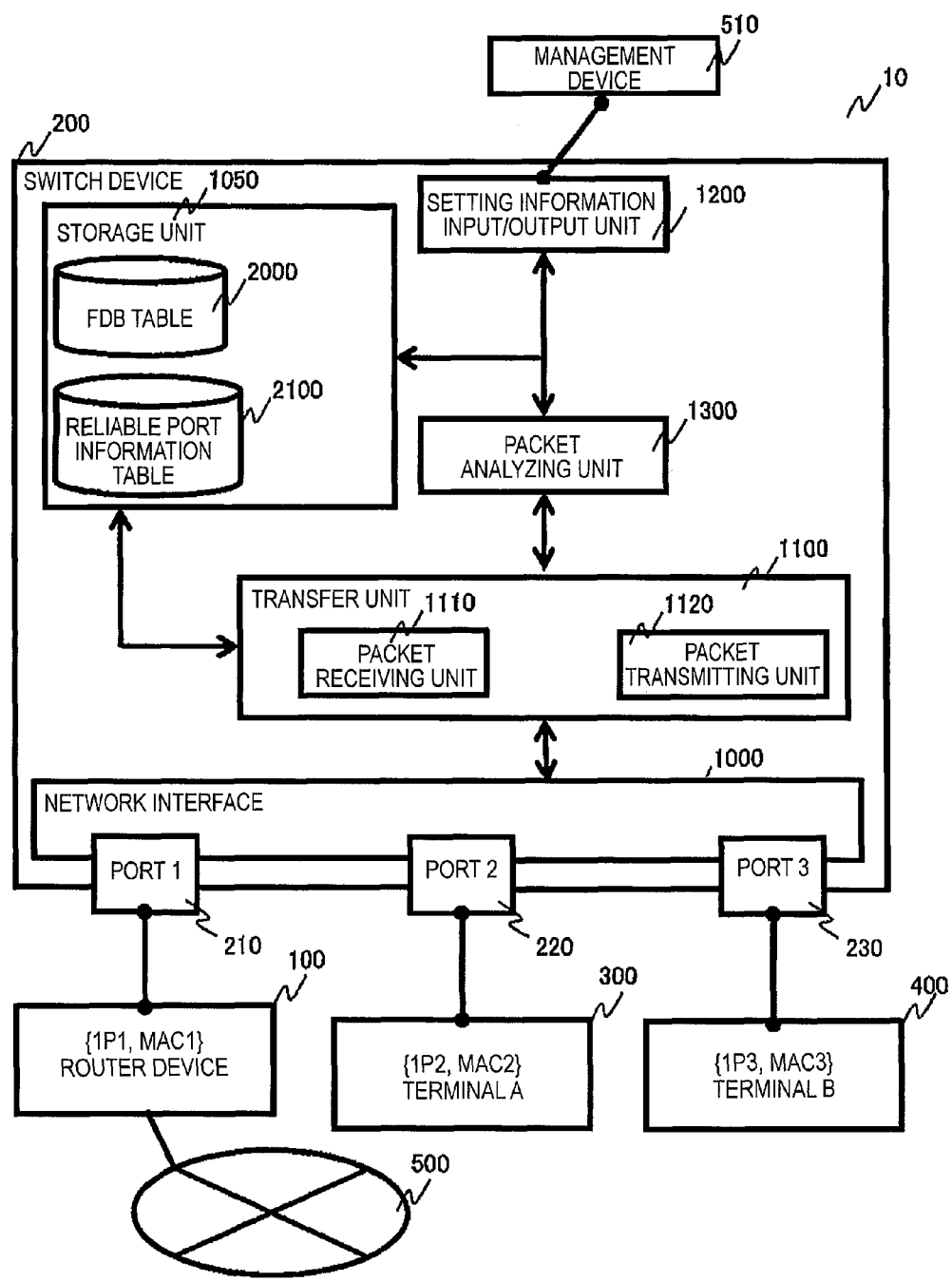
FIG. 1 is a diagram illustrating an entire configuration of a network system and a configuration of a switch device.

FIG. 1 is a diagram illustrating an entire configuration of a network system and a configuration of a switch device to be a transfer device in a first embodiment.

A network system 10 is a network system in a closed network such as a company network that limits communication of terminals other than authenticated terminals by performing authentication (MAC authentication) by a MAC address. The network system 10 includes a router device 100 that has an IP address: IP1 to be one of network addresses and to be a protocol address and a MAC address: MAC1 and has a dynamic host configuration protocol (DHCP) server function, a terminal A 300 that has an IP address: IP2 and an MAC address: MAC2, a terminal B 400 that has an IP address IP3 and a MAC address: MAC3, a switch device 200 that transfers a packet between the router device 100, the terminal A 300, and the terminal B 400 and relays the packet, and a management device 510 that controls the switch device 200 and manages the switch device 200.

The "terminal" is a device (for example, a computer) that performs communication. Hereinafter, the terminal may be described as a "device" or a "communication device". In addition, the switch device 200 or the router device 100 may be referred to as the "communication device". In addition, the switch device 200 may be referred to as a "transfer device". In addition, the router device 100 is connected to the Internet 500.

In this embodiment, explanation is given using an IP address as one of protocol addresses and using a MAC address as one of hardware addresses. However, the present invention is not limited thereto.

Figure 2:
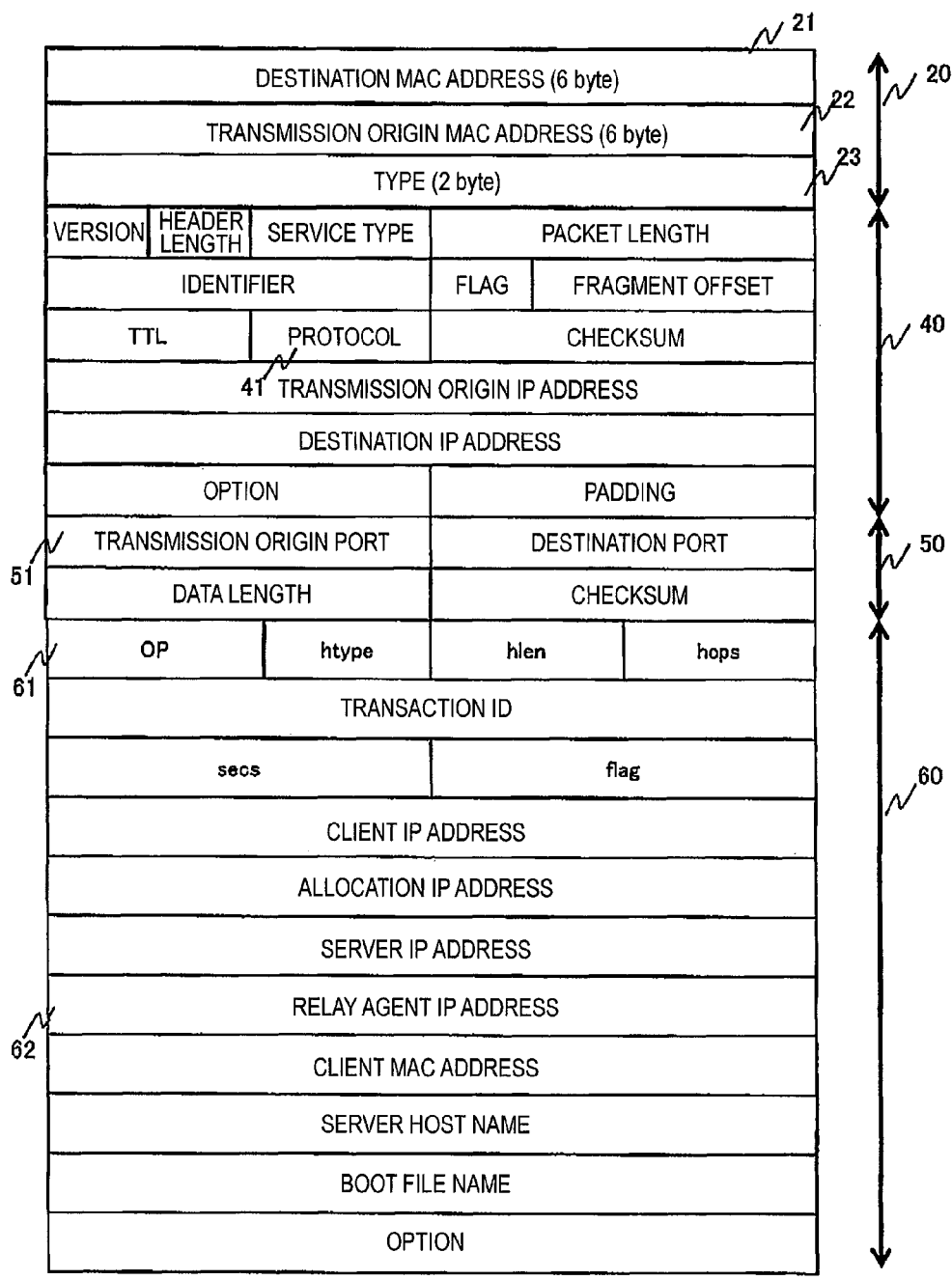
FIG. 2 is a diagram illustrating a DHCP packet.

In addition, the DHCP is a protocol to automatically allocate an IP address to a terminal and a DHCP packet used by the DHCP is a packet configured in a format illustrated in FIG. 2. The format illustrated in FIG. 2 is an example and the present invention is not limited thereto.

The DHCP packet will be described using FIG. 2. The DHCP packet is the same as a packet used for a process of the general DHCP. Therefore, for meanings shown by individual fields or values stored in the individual fields, only meanings and values used in this embodiment will be described.

The DHCP packet is configured by sequentially giving a MAC header 20, an IP header 40, and a UDP header 50 to a DHCP frame 60. The MAC header 20 includes a destination MAC address 21 showing a MAC address of a device of a destination to transmit a packet, a transmission origin MAC address 22 showing a MAC address of a device of a transmission origin to transmit a packet, and a type 23 showing a type of a packet. The IP header 40 includes a protocol 41 showing a protocol to which a packet conforms. The UDP header 50 includes a transmission origin port 51 showing a port to transmit the packet in the device of the transmission origin to transmit the packet. The DHCP frame 60 includes an operation code (OP) 61 showing a type (a request and a reply thereof) of an operation of the DHCP and a relay agent IP address 62 showing an IP address of a DHCP relay agent.

The switch device 200 has a plurality of ports. The port is an input/output unit that performs an input/output (transmission and reception) of a packet with an external device. In the switch device 200, the router device 100 and the port 210, the terminal A 300 and the port 220, and the terminal B and the port 230 are connected by physical lines, respectively. A packet transmitted from the router device 100 is received by the port 210, a packet transmitted from the terminal A 300 is received by the port 220, and a packet transmitted from the terminal B 400 is received by the port 230.

In the first embodiment, the port 210 connected to the router device 100 and the ports 220 and 230 connected to the terminal A 300 and the terminal B 400 in the switch device 200 are set as a reliable port and unreliable ports, respectively. In addition, the terminal A 300 is set as an attack terminal that conducts a cyber attack on the terminal B 400 in the network system and the terminal B 400 is set as a non-attack terminal that is normally operated in the network system and does not conduct the cyber attack. In the following description, because the terminal A 300 conducts the cyber attack on the terminal B 400, the terminal B 400 is expressed as an attacked terminal.

Here, the reliable port is a specific port that is selected and set by a manager in advance, among the plurality of ports of the switch device 200. For example, the reliable port is a port connected to a device (hereinafter, referred to as the "reliable device") that is not a wrong device, but a device that does not conduct the cyber attack, and is reliable. In addition, the reliable device is selected and set by the manager in advance.

In addition, in this embodiment, the device connected to the reliable port is a device which is positioned at a termination of the closed network and through which a large amount of packets in the closed network pass. For this reason, if a wrong device is camouflaged with the device, communication interruption may occur in a wide range in the closed network and thus, the device needs to be protected from the cyber attack.

That is, the reliable port is a port in which communication in the port needs to be protected. Therefore, the reliable port may be referred to as a communication protection port. In addition, the reliable port is a port (monitor object port) of an object to monitor whether the device connected to the port is impersonated or not by the attack terminal.

In addition, the reliable device is a device in which communication in the device needs to be protected. Therefore, the reliable device may be referred to as a communication protection device. In this embodiment, the reliable device is described as the router device 100. However, if a device is an important device (for example, a server device) even though the device is not a device positioned at the termination of the closed network, the manager may previously recognize the device as the reliable device and set the device as the reliable device.

In addition, when a plurality of reliable devices exist in the closed network, the plurality of ports of the switch device 200 are set as the reliable ports.

In this embodiment, the cyber attack is described as occurrence of communication interruption in the attacked terminal by transmitting address resolution packets (also referred to as camouflage address resolution packets) having impersonated the router device 100 by the attack terminal. In this embodiment, an ARP packet is used as one of the address resolution packets. The protocol is used to manage a relation of a hardware address and a protocol address. By executing an address resolution process by the ARP packet, correspondence information of an IP address of a device of a transmission destination (hereinafter, also referred to as the "destination") of the packet and a MAC address of the device thereof is learned as an ARP table.

The ARP packet is a packet configured in a format illustrated in FIG. 3. In addition, in this embodiment, the port is information on a physical port to simplify the description. However, the port may be configured by a logical port connected to a virtual LAN (VLAN). The format illustrated in FIG. 3 is an example and the present invention is not limited thereto.

The ARP packet will be described using FIG. 3. The ARP packet is the same as a packet used for a process of the general ARP. Therefore, for meanings shown by individual fields or values stored in the individual fields, only meanings and values used in this embodiment will be described.

The ARP packet is configured by giving the MAC header 20 to an ARP frame 30. Because the MAC header 20 is the same as the MAC header 20 of FIG. 2, explanation thereof is omitted. The ARP frame 30 includes an operation 31 showing a type (a request and a reply thereof) of an operation of the ARP, a transmission origin MAC address 32 showing a MAC address of a device to a transmission origin to transmit an ARP packet, a transmission origin IP address 33 showing an IP address of the device of the transmission origin to transmit the ARP packet, and a transmission destination IP address 34 showing an IP address of a device of a destination to transmit the ARP packet.

Here, the problem solved by the present invention will be described in detail with reference to FIG. 1.

In "ARP Cache Poisoning" Steve Gibson (2005-12-11), vulnerability of the ARP is pointed out. If an authentication completed terminal to be an attack terminal uses an ARP Reply packet wrongly, an ARP table (correspondence information of a MAC address and an IP address) (next destination path information) referred to when a received packet is transmitted is rewritten and a cyber attack conducting communication interruption and wiretapping of another terminal (attacked terminal) in the closed network is enabled. This reason is as follows. Because there is no authentication or encryption performed in the ARP to be the protocol obtaining an unknown MAC address from a known IP address, falsification of the ARP packet by the attack terminal is easy and as a result, an ARP table of the attacked terminal is rewritten to a wrong ARP table.

Rewriting of the ARP table by using the ARP Reply packet wrongly will be described using FIGS. 1 and 11.

Figure 11:
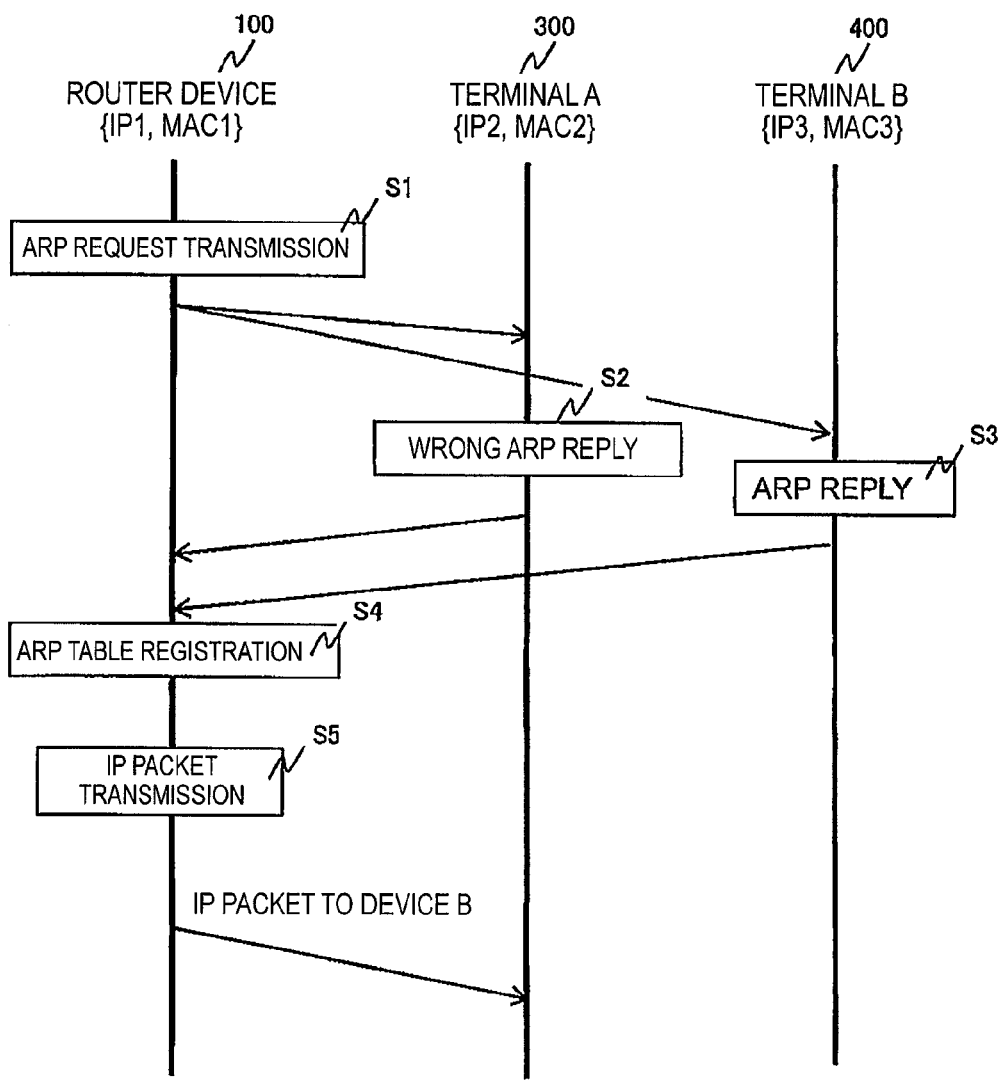
FIG. 11 is a sequence diagram when an ARP Reply packet is used wrongly.

FIG. 11 is a sequence diagram when the terminal A 300 uses the ARP Reply packet wrongly. The router device 100 transmits an ARP Request packet to a destination of an IP address: IP3 by broadcast to acquire a MAC address of a terminal having the IP address: IP3 (S1). The switch device 200 that has received the ARP Request packet to the destination of the IP address: IP3 transmits the ARP Request packet to the terminals A 300 and B 400 by broadcast.

Because the terminal B 400 has the IP address: IP3, the terminal B 400 transmits an ARP Reply packet to provide a MAC address: MAC3 of the terminal B to the router device 100 through the switch device 200 by unicast, for the ARP Request packet (S3).

Meanwhile, because the terminal A 300 has the IP address: IP2, the terminal A 300 does not reply to the ARP Request packet in a normal case. However, if the terminal A 300 impersonates the terminal B 400, changes "the terminal having the IP address: IP3 to the terminal A (MAC address: MAC2)", and transmits a wrong ARP Reply packet to provide the MAC address: MAC2 of the terminal A 300 to the router device 100 through the switch device 200 by the unicast, for the ARP Request packet to inquire the MAC address of the terminal having the IP address: IP3 (S2), the router device 100 receives the wrong ARP Reply packet, determines the MAC address corresponding to the IP address: IP3 as "MAC2', and registers the ARP table (S4). As a result, the router device 100 transmits the packet to be transmitted to the terminal B 400 having the IP address: IP3 to the destination of the MAC address: MAC2 (S5), so that the packet to be transmitted to the terminal B 400 originally is transmitted to the terminal A 300 through the switch device 200.

Therefore, the terminal A 300 to be the attack terminal transmits the wrong ARP Reply packet to the router device 100, so that the ARP table of the router device 100 is rewritten to the wrong ARP table, the packet is transmitted to the terminal different from the original destination (the packet passes through a wrong path), and communication interruption and wiretapping by the attack terminal are enabled.

The ARP includes a Gratuitous ARP used for detection of address overlapping in the closed network. The Gratuitous ARP is also used to update the ARP table (for example, information of a correlation relation of the IP address and the MAC address) on the terminal in the closed network, in addition to the detection of the address overlapping. That is, the terminal that has received the Gratuitous ARP Request packet updates the ARP table made by learning in advance.

Therefore, the attack terminal uses the Gratuitous ARP packet wrongly, so that the attack terminal compulsorily updates the ARP table of the attacked terminal, and the attack terminal changes a communication path such that the packet transmitted and received by the attacked terminal passes through the wrong path. In addition, the communication interruption and the wiretapping by the attack terminal are enabled.

As described above, there is a challenge in that in the closed network having the authentication function, the authentication completed terminal impersonates another authentication completed terminal, the authentication completed terminal uses the address resolution packet wrongly, and the cyber attack conducting the communication interruption and the wiretapping of another terminal in the closed network is enabled.

Hereinafter, one aspect of the present invention to solve the above problem will be described in detail.

An internal configuration of the switch device 200 will be described with reference to FIG. 1.

The switch device 200 includes a network interface 1000, a transfer unit 1100, a setting information input/output unit 1200, a packet analyzing unit 1300, and a storage unit 1050. The transfer unit 1100 is also described as a transfer engine, the storage unit 1050 is also described as a memory, and the packet analyzing unit 1300 and the setting information input/output unit 1200 are also described as a control unit.

The network interface 1000, the transfer unit 1100, the setting information input/output unit 1200, and the packet analyzing unit 1300 may be realized by hardware by designing these elements by an integrated circuit such as a field-programmable gate array (FPGA). In addition, the transfer unit 1100 or the packet analyzing unit 1300 is a processor and each function may be realized by executing a program stored in the storage unit (memory) 1050 by the transfer unit 1100 or the packet analyzing unit 1300. In this case, a process executed by the transfer unit 1100 or the packet analyzing unit 1300 in the following description is executed by the processor corresponding to the transfer unit 1100 or the packet analyzing unit 1300 in fact.

In the storage unit 1050, a forwarding database (FDB) table 2000 to be information regarding transferring of a packet and a reliable port information table 2100 to be information regarding a reliable port are stored.

The network interface 1000 controls the plurality of ports 210 to 230 of the switch device 200, assigns values showing port numbers to the ports 210 to 230 from 1, and manages the ports 210 to 230. For this reason, the port 210 corresponds to a port number 1, the port 220 corresponds to a port number 2, and the port 230 corresponds to a port number 3. The number of terminals connected to the switch device 200 may be three or more. Generally, the number of ports of the switch device 200 is equal to or more than the number of devices to be connected.

If the network interface 1000 receives the packet by the individual ports 210 to 230, the network interface 1000 transfers the received packet (hereinafter, referred to as the "reception packet") to the transfer unit 1100 and notifies the transfer unit 1100 of a reception port number to be the port number of the port having received the packet. In addition, if an output destination port number to be the port number of the port of the output destination of the packet is provided from the transfer unit 1100 and the transfer packet is received from the transfer unit 1100, the network interface 1000 performs control to transmit the transfer packet received from the port corresponding to the output destination port number. In addition, the port number is information to identify each port.

The transfer unit 1100 has a packet receiving unit 1110 and a packet transmitting unit 1120. The packet receiving unit 1110 makes an FDB table 2000 to be correspondence information of the MAC address of the device of the transmission destination of the packet and the port number of the port of the output destination to transmit the packet from the information included in the header of the reception packet transferred by the network interface 1000 and the reception port number notified by the network interface 1000. That is, the FDB table 2000 is the correspondence information of the port and the MAC address in which the port number of each port and each MAC address of the device connected to each port are associated with each other.

In addition, the information of the output destination port number to be the port number of the output destination to transmit the packet, the information of the reception port number, and the reception packet are transmitted as a set of information {reception packet, reception port number, and output destination port number} to the packet analyzing unit 1300, using the reception packet, the reception port number, and the various information stored in the FDB table 2000.

Here, the FDB table 2000 will be described using FIG. 4. The FDB table 2000 includes a destination MAC address 2010 to be the MAC address of the device of the destination of the packet and an output destination port number 2020 to be the port number of the output destination of the packet. That is, the FDB table 2000 is a table (port number/MAC address correspondence table) in which the MAC address of the destination of the packet and the number of the port to which the device having the MAC address is connected are associated with each other. In the destination MAC address 2010, the MAC addresses of the devices connected to the individual ports 210 to 230 are stored and in the output destination port number 2020, the port numbers of the individual ports 210 to 230 managed by the network interface 1000 are stored. By referring to the FDB table 2000, the transfer destination of the packet is specified.

If the switch device 200 receives the packet by the individual ports 210 to 230, the packet receiving unit 1110 stores the MAC address stored in the transmission origin MAC address 22 of the reception packet in the destination MAC address 2010, stores the reception port number notified from the network interface 1000 in the output destination port number 2020, and makes the FDB table 2000.

For this reason, in the network system 10 of FIG. 1, in the FDB table 2000 of the switch device 200, each entry illustrated in FIG. 4 is created by reception of the packets in the ports 210, 220, and 230.

Although described in detail below, the packet transmitting unit 1120 transmits the information of {output destination port number and transfer packet} transmitted by the packet analyzing unit 1300 to the network interface 1000.

The setting information input/output unit 1200 receives setting of configuration information (input of setting information) for the switch device 200 by a manager of the network system 10 and stores (registers) the received configuration information in the storage unit 1050. In addition, the setting information input/output unit 1200 interprets the registered configuration information. For example, the setting information input/output unit 1200 updates the reliable port information table 2100, on the basis of the configuration information illustrated in FIG. 5.

The setting information input/output unit 1200 is an interface that is connected to the management device 510 operated by the manager, receives the input of the setting information or the various controls from the manager, and outputs the setting information stored (registered) in the storage unit 1050 to the management device 510.

For example, one of the ports of the network interface 1000 may be set as the setting information input/output unit 1200. In addition, the setting information input/output unit 1200 may be an input/output display unit by a graphic user interface (GUI) provided in the switch device 200.

The reliable port information table 2100 has a reliable port 2110, a router IP address 2120, and a router MAC address 2130, as illustrated in FIG. 6. The reliable port 2110 is a reliable port set by the manager, the router IP address 2120 is an IP address of the device connected to the reliable port, and the router MAC address 2130 is a MAC address of the device. In this embodiment, because a communication device connected to the reliable port is the router device, the IP address and the MAC address are represented as a router IP address and a router MAC address. However, the communication device connected to the reliable port is not limited to the router device. For this reason, the router IP address may be referred to as a "reliable device (communication protection device) IP address" and the router MAC address may be referred to as a "reliable device (communication protection device) MAC address". The registration of the reliable port information table 2100 will be described using FIG. 8.

FIG. 5 illustrates an example of a command of configuration information received by the switch device 200 and stored in the storage unit (memory) 1050. In the configuration information, the setting information input/output unit 1200 interprets the "port 2" and the "port 3" as the ports performing the MAC authentication in rows 1 to 4, validates the MAC authentication function by a row 5, interprets the information of the MAC address in which communication is allowed by the MAC authentication, in rows 6 and 7, and registers the MAC address in which the communication is allowed as the database to become the MAC authentication information in the storage unit (memory) 1050 of the switch device 200 by a row 8. In addition, in rows 9 and 10, the setting information input/output unit 1200 interprets the "port 1" as the reliable port and registers the "port 1" in the reliable port 2110. Thereby, the reliable port information table 2100 holds an entry of the "port 1".

By this process, the reliable port information table 2100 becomes a table that has entries corresponding to the number of reliable ports analyzed as the reliable ports by the setting information input/output unit 1200. In the router IP address 2120 and the router MAC address 2130, analysis results for the packets received from the reliable ports by the packet analyzing unit 1300 are stored. This storage process will be described with reference to FIG. 8 to be described below. The manager may previously set one side or both sides of the MAC address and the IP address of the device connected to the reliable port as well as the reliable port as the configuration information.

When the packet analyzing unit 1300 receives the packet from the reliable port, the packet analyzing unit 1300 detects the reliable port 2110 and updates the router IP address 2120 and the router MAC address 2130, on the basis of the information of "reception packet, reception port number, and output destination port number" notified from the packet receiving unit 1110 and the reliable port information table 2100. The update of the reliable port information table 2100 will be described in detail below.

When the packet analyzing unit 1300 receives the packet from the unreliable port, the packet analyzing unit 1300 analyzes whether the received packet is the address resolution packet and determines whether the received packet is relayed or discarded (determines whether the packet transfer is enabled or disabled). That is, if the packet analyzing unit 1300 receives the address resolution packet transmitted by the devices (the terminals A 300 and A 400) connected to the ports 220 and 230 through the ports 220 and 230 other than the reliable port (the port 210) to be the specific port among the ports 210, 220, and 230, the packet analyzing unit 1300 compares the MAC address of the device (the terminals A 300 and B 400) of the transmission origin included in the address resolution packet and the router MAC address 2130 to be the MAC address of the router device 100 connected to the reliable port (the port 210) of the reliable port information table 2100 stored in the storage unit 1050 and determines whether the received address resolution packet is discarded or transferred (relayed).

When the received address resolution packet is relayed, the packet analyzing unit 1300 transmits the information of the output destination port number notified from the packet receiving unit 1110 and the reception packet to be the transfer packet as the information of {output destination port number and transfer packet} to the packet transmitting unit 1120.

Next, a process in which the packet analyzing unit 1300 determines whether the port having received the packet is the reliable port or the unreliable port, on the basis of the information notified from the packet receiving unit 1110, will be described.

Figure 7:
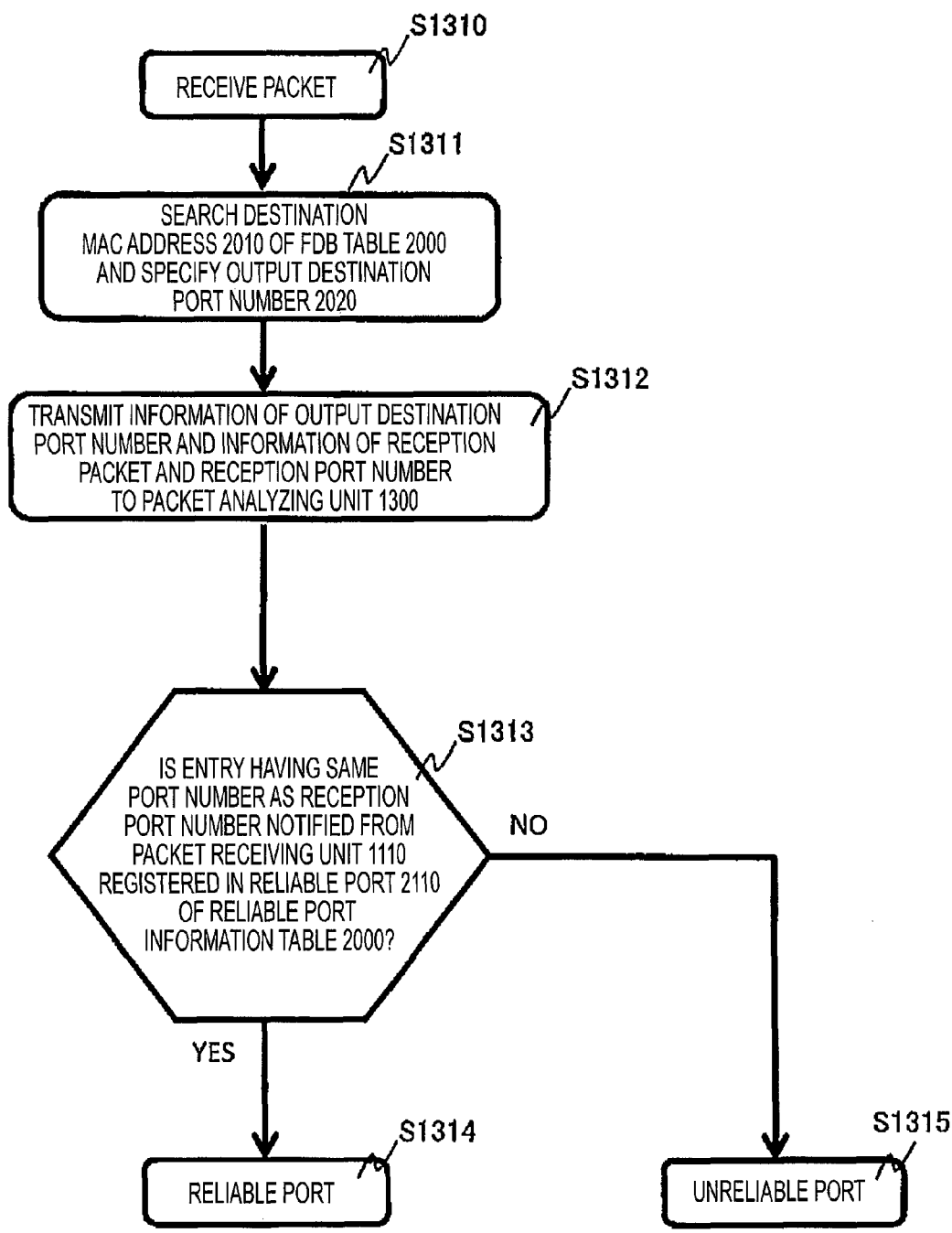
FIG. 7 is a diagram illustrating an example of a flow of a reliable port determination process in a packet analyzing unit when a packet is received, in the first embodiment.

FIG. 7 is a diagram illustrating a flow of a reliable port determination process in the packet analyzing unit 1300 when the packet is received in one port among the ports 210, 220, and 230.

If any port of the ports 210 to 230 receives the packet, the port transfers the reception packet to the packet receiving unit 1110 through the network interface 1000 and the network interface 1000 notifies the packet receiving unit 1110 of the reception port number to be the port number of the port having received the packet (S1310).

The packet received in each of the ports 210 to 230 is a packet transmitted by the authentication completed device in which the MAC authentication has been completed. That is, if each device is connected to the switch device 200, the switch device 200 determines whether the MAC address previously stored (registered) as the MAC authentication information in the storage unit 1050 of the switch device 200 and the MAC address of each device are matched with each other.

When the MAC addresses are matched with each other, the switch device 200 determines that the device in which the MAC addresses are matched with each other is the authentication completed device and permits the transmission of the packet by the authentication completed device. When the MAC addresses are not matched with each other, the switch device 200 does not permit the transfer of the packet by the device in which the MAC addresses are not matched with each other. In this case, the switch device 200 may discard the packet transmitted by the device in which the MAC addresses are not matched with each other and may notify the manager that the device in which the MAC addresses are not matched with each other is connected to the switch device 200, through the setting information input/output unit 1200.

In addition, the MAC authentication is not limited to the execution at the time of the device connection and may be executed for each cycle arbitrarily set by the manager and may be executed whenever the packet is received in each of the ports 210 to 230.

The packet receiving unit 1110 searches the destination MAC address 2010 of the FDB table 2000 using the MAC address stored in the destination MAC address 21 of the MAC header 20 of the reception packet transferred through the network interface 1000 and specifies the output destination port number 2020 corresponding to the destination MAC address 2010 matched with the MAC address of the reception packet (S1311). The packet receiving unit 1110 transmits the information of the output destination port number stored in the specified output destination port number 2020, the transferred reception packet, and the information of the notified reception port number to the packet analyzing unit 1300 (S1312). The packet analyzing unit 1300 confirms whether the entry having the same port number as the reception port number notified from the packet receiving unit 1110 of the transfer unit 1100 is registered in the reliable port information table 2100 (S1313). That is, the packet analyzing unit 1300 searches the reliable port 2110 of the reliable port information table 2100 using the reception port number and specifies the reliable port 2110 matched with the reception port number.

The reliable port 2110 registered in the reliable port information table 2100 has the port number set as the reliable port by the manager. For this reason, when the reception port number is registered in the reliable port 2110 (YES of S1313), it is determined that the port having the reception port number is operated as the reliable port (S1314).

Meanwhile, when the reception port number is not registered in the reliable port 2110 (NO of S1314), it is determined that the port having the reception port number is operated as the unreliable port not to be the reliable port (S1315).

Next, the process of step S1313 will be described using an example of the case in which the packet is received in the port 210. The packet analyzing unit 1300 determines whether an entry matched with the port 1 to be the reception port number notified from the packet receiving unit 1110 exists in the reliable port 2110 of the reliable port information table 2100 of FIG. 6. As a result, because the port 1 exists in the reliable port 2110 of the reliable port information table 2100, the packet analyzing unit 1300 determines that the received port 210 is the reliable port.

Next, the process of step S1313 will be described using an example of the case in which the packet is received in the port 220. The packet analyzing unit 1300 determines whether an entry matched with the port 2 to be the reception port number notified from the packet receiving unit 1110 exists in the reliable port 2110 of the reliable port information table 2100 of FIG. 6. As a result, because the port 2 does not exist in the reliable port 2110 of the reliable port information table 2100, the packet analyzing unit 1300 determines that the received port 220 is the unreliable port.

Next, an update (registration) operation of the reliable port information table 2100 by the packet analyzing unit 1300 when the packet is received from the port connected to the reliable port will be described.

Figure 8:
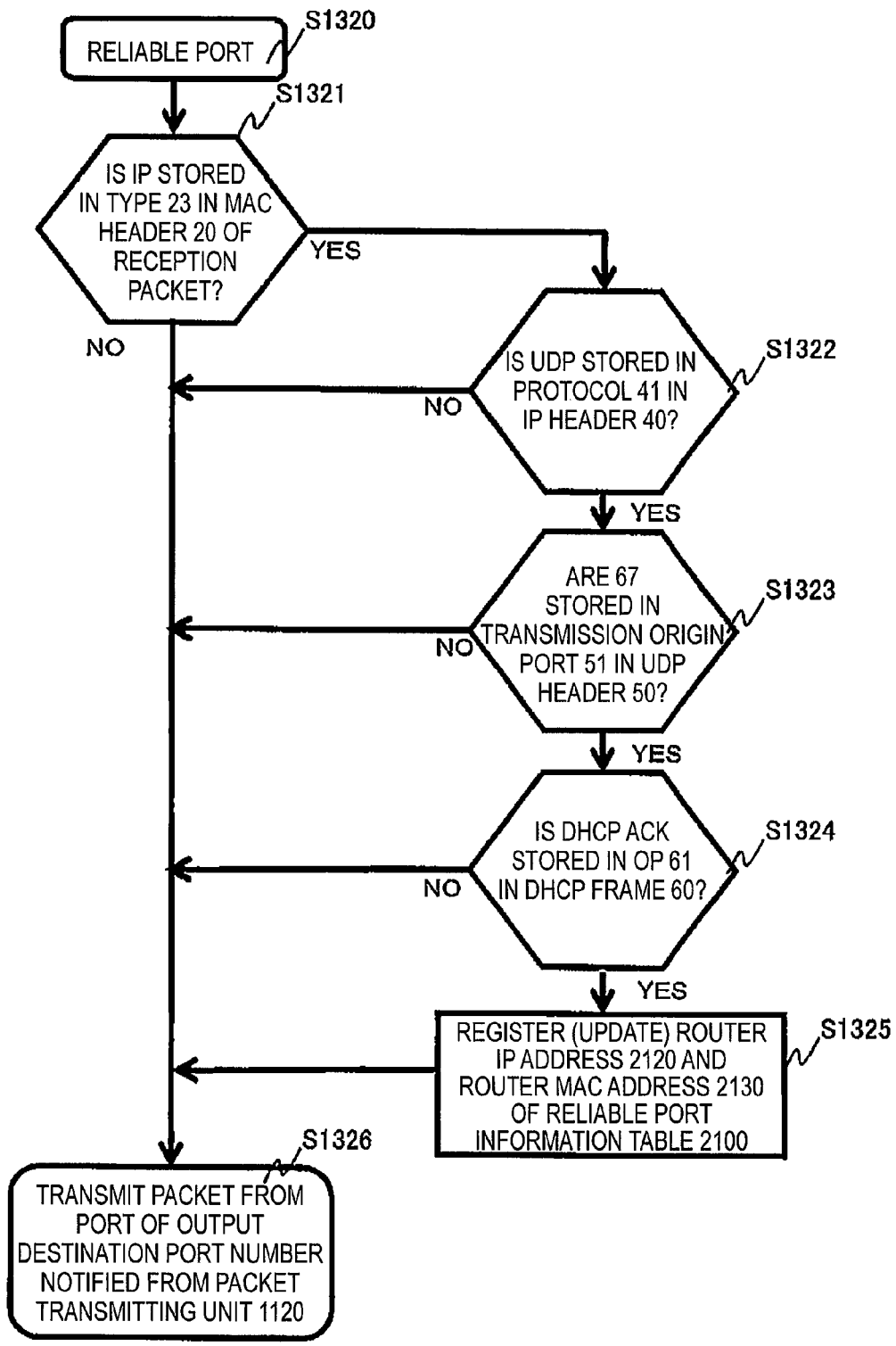
FIG. 8 is a diagram illustrating an example of a flow of a update (registration) process of a reliable port information table by the packet analyzing unit when a packet is received by a reliable port, in the first embodiment.

FIG. 8 is a diagram illustrating a flowchart of the update (registration) process of the reliable port information table 2100 by the packet analyzing unit 1300 when the packet is received in the port determined as the reliable port in S1314 of FIG. 7.

When the port having received the packet is the reliable port (S1320), the packet analyzing unit 1300 analyzes the information of {reception packet, reception port number, and output destination port number} notified from the packet receiving unit 1110 and updates (registers) the entry corresponding to the notified reception port number in the reliable port 2110 of the reliable port information table 2100.

Specifically, the packet analyzing unit 1300 determines whether the IP is stored in the type 23 in the MAC header 20 of the reception packet (S1321). When the IP is stored (YES of S1321), the packet analyzing unit 1300 determines whether the UDP is designated in the protocol 41 in the IP header 40 (S1322). When the UDP is designated (YES of S1322), the packet analyzing unit 1300 determines whether "67" to be a value stored when the DHCP server transmits the DHCP packet to the transmission origin port 51 in the UDP header 50 is stored (S1323). When "67" is stored (YES of S1323), the packet analyzing unit 1300 determines that the reception packet is the DHCP packet transmitted by the DHCP server. That is, as described with reference to FIG. 2, because the MAC header 20, the IP header 40, and the UDP header 50 are given to the DHCP packet, the MAC header 20 is analyzed in S1321, the IP header 40 is analyzed in S1322, and the UDP header 50 is analyzed in S1323, so that it is determined whether the reception packet is the DHCP packet.

When the reception packet is the DHCP packet (YES of S1323), the packet analyzing unit 1300 analyzes whether the DHCP server returns the reply to the device of the transmission destination of the reception packet for the address allocation. Specifically, the packet analyzing unit 1300 determines whether the DHCP ACK is stored in the OP 61 in the DHCP frame 60 (S1324). When the DHCP ACK is stored (YES of S1324), the packet analyzing unit 1300 registers the relay agent IP address 62 in the DHCP frame 60 and the transmission origin MAC address 22 of the MAC header 20 in the router IP address 2120 and the router MAC address 2130 of the entries corresponding to the notified reception port numbers in the reliable port 2110 of the reliable port information table 2100, respectively (S1325). Here, because the IP address of the router device 100 is stored in the relay agent IP address 62, the router IP address 2120 is registered using the relay agent IP address 62. However, in the case of the IP address of the router device 100, the IP address may be another IP address included in the DHCP packet.

When the values are previously stored in the router IP address 2120 and the router MAC address 2130, respectively, the router IP address 2120 and the router MAC address 2130 are updated.

Then, the packet analyzing unit 1300 transmits the information of the output destination port number of the reception packet notified from the packet receiving unit 1110 and the reception packet to be the transfer packet as the information of {output destination port number and transfer packet} to the packet transmitting unit 1120, the packet transmitting unit 1120 transmits the information of {output destination port number and transfer packet} from the packet analyzing unit 1300 to the network interface 1000, and the network interface 1000 transmits the transfer packet from the port of the output destination, according to the information of {output destination port number and transfer packet} from the packet transmitting unit 1120 (S1326).

When the determination result is "NO" in any one of S1321 to S1324, the process proceeds to S1326. In each step, even when the IP header 40, the UDP header 50, and the DHCP frame 60 are not included in the reception packet, the determination result is "NO".

As such, in this embodiment, because the device connected to the reliable port is the router device 100 having the DHCP server function, the DCHP packet from the router device 100 connected to the reliable port is analyzed and the reliable port information table 2100 is updated. For this reason, each step of the flowchart of FIG. 8 may be appropriately changed, such that the format of the specific packet transmitted by the specific device is analyzed when the specific device (for example, the server device) other than the router device 100 is connected to the reliable port and the reliable port information table 2100 is updated when the specific packet is transmitted from the specific device.

In FIG. 8, the reliable port 2110 of the reliable port information table 2100 is registered by the input from the manager and the router IP address 2120 and the router MAC address 2130 are registered dynamically by analyzing the DHCP packet received from the router device 100. However, the manager may previously input the reliable port 2110 and the router IP address 2120 and the router MAC address 2130 and register the reliable port 2110 and the router IP address 2120 and the router MAC address 2130 statically.

Next, a series of processes including FIGS. 7 and 8 in the switch device 200 will be described using an example of the case in which the DHCP ACK packet transmitted from the router device 100 to the terminal A 300 is transmitted by the switch device 200.

The router device 100 transmits to the terminal A 300 the DHCP ACK packet in which the MAC2 is stored in the destination MAC address 21 in the MAC header 20, the MAC1 is stored in the transmission origin MAC address 22, the IP is stored in the type 23, the UDP is stored in the protocol 41 in the IP header 40, 67 showing the DHCP packet from the DHCP server is stored in the transmission origin port 51 in the UDP header 50, the DHCP ACK is stored in the OP 61 in the DHCP frame 60, and the IP1 is stored in the relay agent IP address 62. For this reason, the DHCP ACK packet transmitted by the router device 100 is configured in order of the MAC header 20, the IP header 40, the UDP header 50, and the DHCP frame 60.

The switch device 200 receives the DHCP ACK packet transmitted by the router device 100 from the port 210. The network interface 1000 notifies the packet receiving unit 1110 of the port 1 obtained by converting the port 210 into the port number. The packet receiving unit 1110 searches whether the MAC2 to be the destination MAC address 21 of the received DHCP ACK packet exists in the destination MAC address 2010 of the FDB table 2000, specifies the output destination port number 2020 as a result, and acquires the port 2 as the output destination port number. The packet receiving unit 1110 transmits {reception packet: DHCP ACK packet, reception port number: port 1, and output destination port number: port 2} to the packet analyzing unit 1300. The packet analyzing unit 1300 executes the process of S1313 of FIG. 7 on the port 1 and determines that the packet is received from the reliable port.

Next, the packet analyzing unit 1300 executes the process of FIG. 8. In S1321, because the IP is stored in the type 23 of the MAC header 20 of the received DHCP ACK packet, it may be known that the IP header is given. As a result, the packet analyzing unit 1300 executes S1322. In S1322, because the UDP is stored in the protocol 41 of the IP header 40 of the received DHCP ACK packet, the packet analyzing unit 1300 executes S1323 as a result. In S1323, because 67 showing the notification from the DHCP server are stored in the transmission origin port 51 of the UDP header 50 of the received DHCP ACK packet, the packet analyzing unit 1300 executes S1324 as a result. In S1324, because the DHCP ACK is stored in the OP 61 of the DHCP frame 60, the packet analyzing unit 1300 executes S1325 as a result. In S1325, the packet analyzing unit 1300 updates the IP1 stored in the relay agent IP address 62 in the received DHCP ACK packet and the MAC1 stored in the transmission origin MAC address 22 in the received DHCP ACK packet in the router IP address 2120 and the router MAC address 2130, respectively, in the entry of the port 1 to be the reception port number notified from the packet receiving unit 1110 in the reliable port 2110 of the reliable port information table 2100. As a result, the IP1 is registered in the router IP address 2120 in the reliable port information table 2100 and the MAC1 is registered in the router MAC address 2130 and the reliable port information table 2100 illustrated in FIG. 6 is obtained.

Then, the switch device 200 transfers the packet from the port 220 corresponding to the output destination port number: port 2 notified from the packet receiving unit 1110 through the packet analyzing unit 1300, the packet transmitting unit 1120, and the network interface 1000 to the terminal A 300.

Next, a series of processes including FIGS. 7 and 8 in the switch device 200 will be described using an example of, the case in which the router device 100 transmits the ARP packet to be the address resolution packet to the terminal A 300.

The router device 100 transmits the ARP packet in which the MAC2 is stored in the destination MAC address 21 in the MAC header 20, the MAC1 is stored in the transmission origin MAC address 22, and the ARP is stored in the type 23, to the terminal A 300. The switch device 200 receives the ARP packet from the port 210. Because transmission processes from the network interface 1000 and the packet receiving unit 1110 to the packet analyzing unit 1300 are the same as the processes of S1310 to S1312 of FIG. 7, explanation thereof is omitted.

The packet analyzing unit 1300 executes S1313 and determines the reception port number: port 1 as the reliable port. For this reason, the process proceeds to the process of FIG. 8 and S1321 is executed. In S1321, the ARP is stored in the type 23 of the reception packet and the IP is not stored (NO of S1321). As a result, the reliable port information table 2100 is not updated.

Next a series of operations by the packet analyzing unit 1300 when the packet is received from the port connected to the unreliable port will be described.

Figure 9:
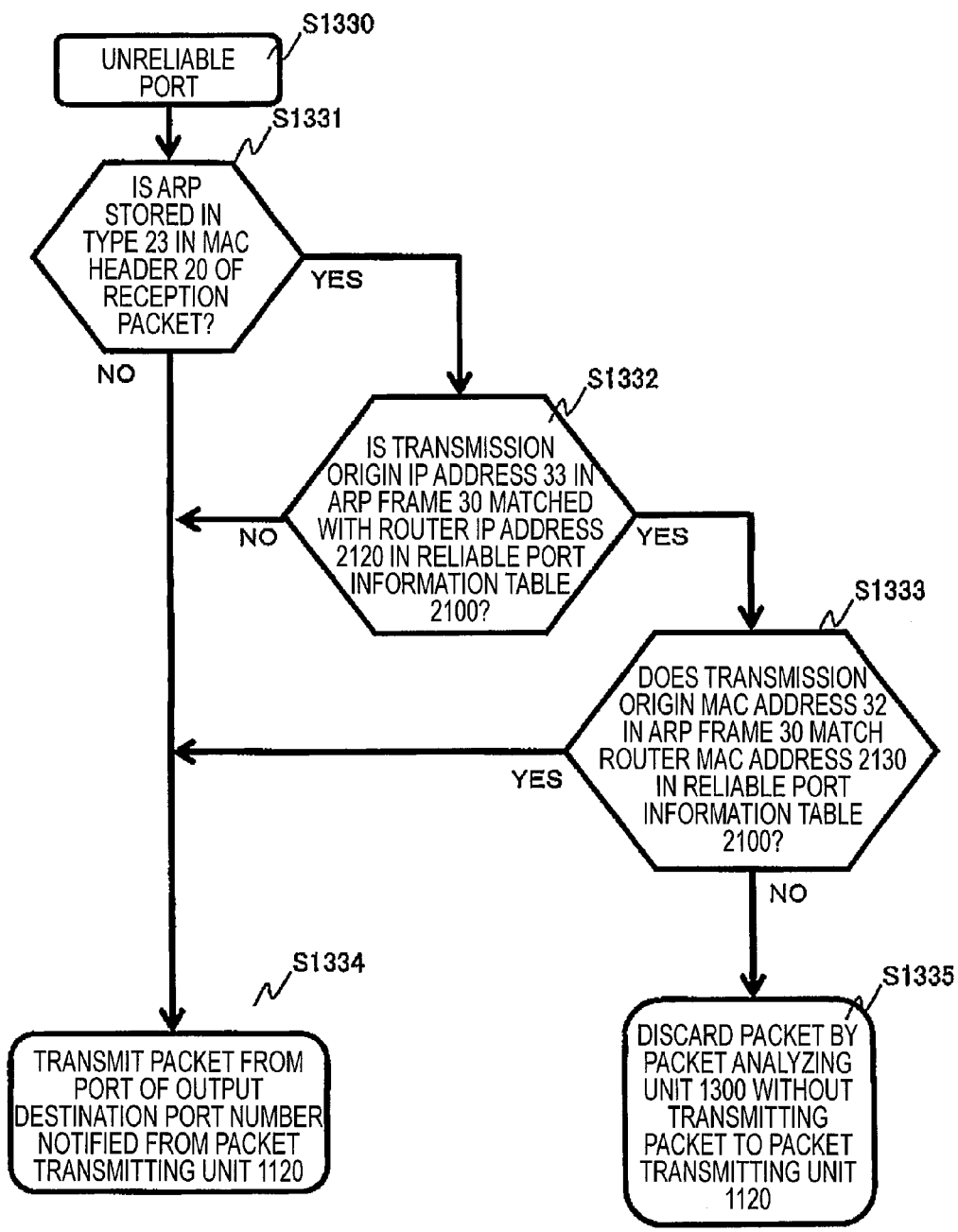
FIG. 9 is a diagram illustrating an example of a flow of a process when a packet is received by an unreliable port, in the first embodiment.

FIG. 9 is a diagram illustrating a flowchart of a process when the packet is received in the port determined as the unreliable port in S1315 of FIG. 7.

When the port having received the packet is the unreliable port (S1330), the packet analyzing unit 1300 analyzes the information of {reception packet, reception port number, and output destination port number} transmitted from the packet receiving unit 1110, determines whether the reception packet is the ARP packet (address resolution packet), and determines whether the reception packet is the address resolution packet having impersonated the device connected to the reliable port.

Specifically, the packet analyzing unit 1300 determines whether the reception packet is the ARP packet by determining whether the ARP is stored in the type 32 in the MAC header 20 of the reception packet (S1331). When the ARP is stored (YES of S1331), the packet analyzing unit 1300 determines whether an entry matched with the IP address stored in the transmission origin IP address 33 in the ARP frame 30 exists in the router IP address 2120 of the reliable port information table 2100 (S1332). When the entry matched with the IP address exists (YES of S1332), the packet analyzing unit 1300 determines whether an entry matched with the MAC address stored in the transmission origin MAC address 33 in the ARP frame 30 exists in the router MAC address 2130 of the reliable port information table 2100 (S1333). When the entry matched with the MAC address exists (YES of S1333), the packet analyzing unit 1300 transmits the information of the output destination port number of the reception packet notified from the packet receiving unit 1110 and the reception packet to be the transfer packet as the information of {output destination port number and transfer packet} to the packet transmitting unit 1120, the packet transmitting unit 1120 transmits the information of {output destination port number and transfer packet} from the packet analyzing unit 1300 to the network interface 1000, and the network interface 1000 transmits the transfer packet from the port of the output destination, according to the information of {output destination port number and transfer packet} from the packet transmitting unit 1120 (S1334).

When the entry matched with the MAC address does not exist in S1333 (NO of S1333), the packet analyzing unit 1300 determines that the reception packet is the address resolution packet having impersonated the device connected to the reliable port and discards the reception packet without transmitting the reception packet to the packet transmitting unit 1120 (S1335).

In addition, when it is determined that the reception packet is the address resolution packet (camouflaged packet) having impersonated the device connected to the reliable port, the switch device 200 may specify the information (the IP address and the MAC address of the terminal and the number of the port to which the terminal is connected) for the terminal having transmitted the camouflaged packet and notify the management device 510 of the information through the setting information input/output unit 1200 (issues an alarm). By specifying at least the transmission origin MAC address 22 of the camouflaged packet, the information for the terminal having transmitted the camouflaged packet is specified.

The case of YES of S1333 is the case of the ARP packet in which the transmission origin MAC address 32 in the ARP frame 30 is camouflaged with the MAC address stored in the router MAC address 2130. In this case, the packet analyzing unit 1300 does not process the ARP packet as the wrong ARP packet for the attacked terminal and proceeds to S1334.

When the determination result is "NO" in any one of S1331 and S1332, the packet analyzing unit 1300 proceeds to S1334.

As such, it is determined whether the reception packet is the ARP packet (address resolution packet) in S1331, it is determined whether the reception packet may impersonate the device connected to the reliable port in S1332, and it is determined whether the transmission origin of the reception packet is the device connected to the reliable port in S1333.

When it is determined that the reception packet is the address resolution packet transmitted after impersonating the device connected to the reliable port, the packet analyzing unit 1300 discards the received packet. Meanwhile, when it is determined that the reception packet is the packet other than the address resolution packet transmitted after impersonating the device connected to the reliable port, the packet analyzing unit 1300 transfers the reception packet from the port of the output destination port number of the reception packet.

Therefore, the case in which it is determined that the reception packet is the address resolution packet having impersonated the router device 100 to be the reliable device connected to the reliable port is when the ARP is stored in the type 23 of the reception packet and the same entries as the router IP address 2120 and the router MAC address 2130 stored in the reliable port information table 2100 exist in the transmission origin MAC address 32 and the transmission origin IP address 33.

Next, a flow of the process of FIG. 9 will be described using an example of the case in which the terminal A 300 transmits the address resolution packet having impersonated the router device 100 to the terminal B 400.

The terminal A 300 transmits to the terminal B 400 the address resolution packet having impersonated the router device 100 in which the MAC3 is stored in the destination MAC address 21 in the MAC header 20, the MAC2 is stored in the transmission origin MAC address 22, the ARP is stored in the type 23, the MAC2 is stored in the transmission origin MAC address 32, and the IP1 of the router device 100 is stored in the transmission origin IP address 33 and the transmission destination IP address 34, which is to be transmitted to the switch device 200.

The switch device 200 receives the packet transmitted by the terminal A 300 from the port 220. The network interface 1000 notifies the packet receiving unit 1110 of the port 2 obtained by converting the port 220 into the port number. The packet receiving unit 1110 searches whether the MAC3 to be the destination MAC address of the reception packet exists in the destination MAC address 2010 of the FDB table 2000.

As a result, the port 3 is acquired from the output destination port number 2020. The packet receiving unit 1110 transmits {reception packet, reception port number: port 2, and output destination port number: port 3} to the packet analyzing unit 1300. The packet analyzing unit 1300 executes the process of S1313 of FIG. 7 on the reception port number: the port 2 and determines that the packet is received from the unreliable port. That is, the reception port number: port 2 is not registered in the reliable port 2110 of the reliable port information table 2100.

Next, the packet analyzing unit 1300 executes the process of FIG. 9 to be a process in the unreliable port. In S1331, because the ARP is stored in the type 23 (of the MAC header 20 of the reception packet, the packet analyzing unit 1300 executes S1332. In S1332, the packet analyzing unit 1300 acquires the IP1 of the transmission origin IP address 32 of the ARP frame 30 by the analysis of the reception packet and determines whether there is an entry matched with the entry of the router IP address 2120 of the reliable port information table 2100 illustrated in FIG. 6. The IP1 is stored in the router IP address 2120. As a result, because the entries are matched, the packet analyzing unit 1300 executes S1333. In S1333, the packet analyzing unit 1300 acquires the MAC2 of the transmission origin MAC address 33 of the ARP frame 30 by the analysis of the reception packet and determines whether there is an entry matched with the entry of the router MAC address 2130 of the reliable port information table 2100 illustrated in FIG. 6. The MAC1 is set to the router MAC address 2130. As a result, because the entries are not matched, the packet analyzing unit 1300 determines that the reception packet is the address resolution packet transmitted by the terminal A 300 having impersonated the router device 100 and discards the packet without transmitting {output destination port number and transfer packet} to the packet transmitting unit 1120.

Next, a process flow of FIG. 9 will be described using an example of the case in which the terminal A 300 transmits the address resolution packet of the terminal A 300 to the terminal B 400.

The terminal A 300 stores the MACS in the destination MAC address 21 of the MAC header 20, the MAC2 in the transmission origin MAC address 22, and the ARP in the type 23 and stores the MAC2 in the transmission origin MAC address 32 of the ARP frame 30 and the IP2 of the terminal A 300 in the transmission origin IP address 33 and the transmission destination IP address 34.

Because the determination of the unreliable port of FIG. 7 and S1331 are the same as those in the processes when the address resolution packet having impersonated the router device 100 is transmitted, explanation thereof is omitted.

In S1332, the packet analyzing unit 1300 acquires the IP2 of the transmission origin IP address 32. An entry matched with the router IP address 2120 of the reliable port information table 2100 illustrated in FIG. 6 does not exist for IP2 (NO of S1332). For this reason, the switch device 200 transfers the packet from the port 220 corresponding to the output destination port number: port 3 notified from the packet receiving unit 1110 through the packet analyzing unit 1300, the packet transmitting unit 1120, and the network interface 1000 to the terminal A 300.

Next, a process flow of FIG. 9 will be described using an example of the case in which the terminal A 300 transmits the packet other than the address resolution packet to the terminal B 400.

The terminal A 300 transmits a packet in which the IP is stored in the type 23 of the MAC header 20. In S1331, because the IP is stored in the type 23 (NO of S1331), the packet analyzing unit 1300 determines that the reception packet is not the address resolution packet and the switch device 200 transfers the reception packet.

In the first embodiment described above, the switch device may learn from which of the reliable port relied on by the network system manager or the unreliable port in the packet reception from the plurality of ports, the packet has been received.

In addition, the switch device may learn the IP address and the MAC address of the device (reliable device) connected to the reliable port by the reception of the packet in the reliable port, and the reliable port information table may be made. Thereby, the switch device may determine whether the packet received from the unreliable port is the address resolution packet transmitted by impersonating the router device to be the reliable device connected to the reliable port.

Therefore, the cyber attack by the address resolution packet transmitted by the attack terminal connected to the unreliable port and impersonating the router device is detected and the wrongly used address resolution packet may be prevented from being transmitted to the attacked terminal, by performing control, which does not transfer the packet (control to discard the packet). Therefore, the attacked terminal may maintain communication with the router device.

First Modification

In the first embodiment, in the packet analyzing unit 1300, the reliable port information table 2100 is made and updated by receiving the DHCP ACK packet. However, when the reliable port information table 2100 is made, the wrong packet from the attack terminal having impersonated the router device is made not to be received through the reliable port and the reliable port information table 2100 may be made from the transmission origin IP address and the transmission origin MAC address of the address resolution packet received from the reliable port. For this reason, in the first modification, with respect to FIG. 8, the reliable port information table 2100 is updated according to whether the ARP is stored in S1321 or the request is stored in the operation 31 in S1322 to S1324.

Second Modification

The packet analyzing unit 1300 may determine whether FIG. 8 which is an update process flow of the reliable port information table is executed by the first embodiment or is executed by the first modification.

The packet analyzing unit 1300 executes the update process of a reliable port information table 2101 by the first embodiment or the first modification, by referring to a mode 2140 of the reliable port information table 2101 illustrated in FIG. 10.

When the mode 2140 of FIG. 10 is arp-check-dhcp, FIG. 8 may be executed by the first embodiment and when the mode is arp-check, the reliable port information table 2101 may be updated according to whether the request is stored in the operation 31 in S1322 to S1324 as illustrated in the first modification. The mode 2140 shows whether the mode is a mode in which the update is performed using the DHCP or a mode in which the update is performed without using the DHCP.

Third Modification

In the embodiment, the example of the case in which the ARP of the address resolution packet used by IPv4 is used has been described. In this modification, a neighbor discovery protocol (NDP) of an address resolution packet used by IPv6 is used and the transferring and the discarding of the packet are determined using a reliable port v6 information table made by storing a transmission origin IPv6 address of an IPv6 header of a router advertisement (RA) packet regularly transmitted by the router and a transmission origin MAC address of the MAC header in the router IP address 2120 and the router MAC address 2130 of the reliable port information tables 2100 and 2101.

The example of the configuration of each table included in the switch device 200 was described. However, elements included in the table may be arbitrarily determined without departing from the scope of the present invention. For example, the table may include elements other than the elements described above.

The present invention is not limited to the embodiment described above and various modifications are included in the present invention. For example, the embodiments are described in detail to facilitate the description of the present invention and are not limited to embodiments in which all of the described configurations are included. In addition, a part of the configurations of the embodiment may be replaced by the configurations of other modifications or the configurations of other modifications may be added to the configurations of the embodiment.

Other configurations may be added to a part of the configurations of each embodiment, a part of the configurations of each embodiment may be deleted, and a part of the configurations of each embodiment may be replaced. In addition, a part or all of the individual configurations, functions, processing units, and processing mechanisms may be designed by integrated circuits such as an FPGA and may be realized by hardware. In addition, the individual configurations and functions may be realized by software by interpreting programs for realizing the functions by a processor and executing the programs by the processor. Information such as the programs for realizing the individual functions, the tables, and the files may be stored in a recording device such as a memory, a hard disk, and a solid state drive (SSD) or a recoding medium such as an integrated circuit (IC) card, an SD card, and a DVD.

In addition, the various information has been described by the expression of the "aaa table". However, the various information may be expressed by a data structure other than the table. "aaa table" may be referred to as "aaa information" to show that it does not depend on the data structure.

In addition, control lines and information lines which are thought to be necessary for explanation are illustrated but because of the nature of the product, not all control lines and information lines are necessarily shown. In fact, it is said that almost all configurations may be connected to each other.

What is claimed is:

1. A communication device comprising:
   a plurality of ports which receive packets;
   a memory that stores a forwarding destination port table and a reliable port table, the forwarding destination port table associating the ports by port numbers with packet destinations by media access control (MAC) addresses, and the reliable port table associating the ports by the port numbers with a plurality of specified devices connected to the ports by MAC addresses and with the plurality of specified devices connected to the ports by Internet protocol (IP) addresses;
   a network interface configured to control the ports, and when one of the packets is received by the ports, notify a reception port number of the one of the ports having received the one of the packets;
   a processor connected to the memory and the network interface, the memory storing instructions that, when executed by the processor, cause the processor to:
   receive the one of the packets and the reception port number thereof from the network interface,
   when the received one of the packets is a packet regarding an address resolution, compare the reception port number and a MAC address of a transmission origin device included in the packet regarding the address resolution with the ports and the MAC addresses of the specified devices of the reliable port table stored in the memory, determine whether the packet regarding the address resolution is to be discarded or transferred according to a result of the comparison, when the packet regarding the address resolution is to be transferred, notify the network interface so that one of the ports corresponding to the destination MAC address of the packet regarding the address resolution in the forwarding destination port table transfers the packet regarding the address resolution, when the packet regarding the address resolution is to be discarded, discard the packet regarding the address resolution, when the reception port number of the transmission destination matches one of the port numbers of the reliable port table, determine whether the received one of the packets is a dynamic host configuration protocol (DHCP) packet, and when the received one of the packets is the DHCP packet, update the forwarding destination port table on the basis of the MAC address and the IP address of the transmission origin device included in the DHCP packet and the reception port number.

2. The communication device according to claim 1, wherein the memory further stores instructions that, when executed by the processor, cause the processor to:

when a protocol address of the transmission origin device included in the packet regarding the address resolution matches one of the protocol addresses of the reliable port table, compare the reception port number and the MAC address of the transmission origin device with the ports and the MAC addresses of the specified devices of the reliable port table stored in the memory.

3. The communication device according to claim 2, wherein the memory further stores instructions that, when executed by the processor, cause the processor to:

when the one of the packets is a packet regarding protocol address assignment and the reception port number has a match in the reliable port table, acquire the MAC address and the IP address of the transmission origin device included in the packet regarding the protocol address assignment, and store the acquired MAC address and the IP address of the transmission origin device in association with the reception port number in the reliable port table.

4. The communication device according to claim 3, wherein the memory further stores instructions that, when executed by the processor, cause the processor to:

when the reception port number does not match any of the ports in the reliable port table, compare the MAC address of the transmission origin device with the MAC addresses of the specified devices in the reliable port table, and when the reception port number matches with one of the port numbers in the reliable port table, the analyzing unit determines whether the received one of the packets is the packet regarding the assignment of the protocol address.

5. The communication device according to claim 4, wherein the memory further stores instructions that, when executed by the processor, cause the processor to:
receive setting information for the reliable port table from a management device.

6. The communication device according to claim 5, wherein the memory further stores instructions that, when executed by the processor, cause the processor to:
specify the one of the port numbers of the forwarding destination port table of a transmission destination of the received one of the packets using a MAC address of the transmission destination included in the received packet, and when the reception port number matches one of the port numbers in the reliable port table and the received one of the packets is the DHCP packet, notify the network interface so that specified one of the ports transfers the received one of the packets to the MAC address of the transmission destination.

7. The communication device according to claim 1, wherein the packet regarding the address resolution is an address resolution protocol (ARP) packet, and wherein the memory further stores instructions that, when executed by the processor, cause the processor to:
perform MAC authentication on the packets, and
wherein the memory further stores instructions that, when executed by the processor, cause the processor to:
compare a MAC address of the transmission origin device with the MAC addresses of the specified device of the reliable port table stored in the storage unit, and the MAC address of the transmission origin device is a transmission origin MAC address in an ARP frame included in the ARP packet.

8. A communication control method in a communication device having a plurality of ports that receive packets, the communication control method comprising: storing a forwarding destination port table and a reliable port table, the forwarding destination port table associating the ports by port numbers with packet destinations by media access control (MAC) addresses, and the reliable port table associating the ports by the port numbers with a plurality of specified devices connected to the ports by MAC addresses and with the plurality of specified devices connected to the ports by Internet protocol (IP) addresses;

when one of the packets is received through one of the ports, specifying the port number of the transmission destination of the received packet in the forwarding destination port table that is associated with a MAC address of a transmission destination included in the received one of the packets;

determining whether the specified port number of the transmission destination matches one of the port numbers of the reliable port table;

when the port number does not match the port numbers of the reliable port table, determining whether the received one of the packets is an address resolute protocol (ARP) packet, when the received one of the packets is the ARP packet, determining whether the ARP packet is to be discarded or transferred on the basis of a MAC address and a IP address of a transmission origin device included in the received ARP packet, the reception port number and the reliable port table, when the reception port number of the transmission destination matches one of the port numbers of the reliable port table, determining whether the received one of the packets is a dynamic host configuration protocol (DHCP) packet; and when the received one of the packets is the DHCP packet, updating the forwarding destination port table on the basis of the MAC address and the IP address of the transmission origin device included in the DHCP packet and the reception port number.

* * * * *